US012704590B2

(12) United States Patent
Giere et al.

(10) Patent No.: US 12,704,590 B2
(45) Date of Patent: Aug. 11, 2026

(54) INTERFERENCE MITIGATION BY DYNAMIC FALSE RATE

(71) Applicant: GM Cruise Holdings LLC, San Francisco, CA (US)

(72) Inventors: Andre Giere, Oberpframmern (DE); Jessica Bartholdy Sanson, Munich (DE); Jorge Julio Jácome Muñoz, Munich (DE); Andreas Barthelme, Gars (DE); Johanna Gütlein-Holzer, Taufkirchen (DE); Kalin Hristov Kabakchiev, Munich (DE)

(73) Assignee: GM CRUISE HOLDINGS LLC, San Francisco, CA (US)

( * ) Notice: Subject to any disclaimer, the term of this patent is extended or adjusted under 35 U.S.C. 154(b) by 309 days.

(21) Appl. No.: 18/446,448

(22) Filed: Aug. 8, 2023

(65) Prior Publication Data

US 2025/0020768 A1 Jan. 16, 2025

(30) Foreign Application Priority Data

Jul. 12, 2023 (EP) .................................... 23185019

(51) Int. Cl.
*G01S 7/28* (2006.01)
*G01S 13/75* (2006.01)

(52) U.S. Cl.
CPC ............ *G01S 7/2813* (2013.01); *G01S 13/75* (2013.01)

(58) Field of Classification Search
CPC ...... G01S 7/2813; G01S 7/2922; G01S 7/354; G01S 7/023; G01S 13/75; G01S 13/325; G01S 13/42; G01S 13/582; G01S 13/584; G01S 13/931
See application file for complete search history.

(56) References Cited

U.S. PATENT DOCUMENTS

| | | | | |
|---|---|---|---|---|
| 4,031,364 A * | 6/1977 | Wilmot | G01S 7/2927 | 342/159 |
| 4,489,319 A | 12/1984 | Hansen | | |
| 2023/0258772 A1* | 8/2023 | Skow | G01S 7/415 | 342/195 |
| 2023/0314560 A1* | 10/2023 | Wu | G01S 13/42 | 342/173 |

OTHER PUBLICATIONS

"Extended European Search Report for European Patent Application No. 23185019.9", Mailed Date: Dec. 8, 2023, 12 pages.

* cited by examiner

*Primary Examiner* — Jack W Keith
*Assistant Examiner* — Clayton Paul Ridder
(74) *Attorney, Agent, or Firm* — CANTOR COLBURN LLP

(57) ABSTRACT

A radar system comprises a plurality of receive antennas that receive a radar signal. One or more processors are configured to perform acts selecting one or more training cells for noise power estimation based upon a radar signal received at one or more receive antennas. The acts further comprise calculating a mean noise power value for the one or more training cells and calculating a noise power variance for the one or more training cells. The acts also comprise estimating a probability of false alarm (PFA) threshold to be applied for a non-training cell and estimating a PFA threshold offset based on the noise power variance. The acts further comprise adjusting a current PFA threshold offset based on the estimated PFA threshold offset.

20 Claims, 8 Drawing Sheets

INTERFERENCE MITIGATION BY DYNAMIC FALSE RATE

RELATED APPLICATION

This application claims priority to European Patent Application No. EP 23185019.9, filed on Jul. 12, 2023, and entitled "INTERFERENCE MITIGATION BY DYNAMIC FALSE RATE MODEL". The entirety of this application is incorporated herein by reference.

BACKGROUND

Autonomous or assisted driving strategies have been facilitated through sensing an environment around a vehicle. Radar sensors are conventionally used in connection with detecting and classifying objects in an environment; advantages of radar over other types of sensors (such as cameras or lidar) include robustness in regard to lighting and weather conditions. Often, radar sensors are deployed with cameras and/or lidar sensors to provide different modes of detection and redundancy. In certain scenarios, performance of lidar and/or cameras is negatively impacted by environmental features, such as fog, rain, snow, bright sunlight, lack of adequate light, etc. Accordingly, in these scenarios, radar is relied heavily upon to detect and classify objects in the environment, while lidar and camera sensors are less heavily relied upon.

Conventionally, a radar sensor generates a radar tensor (which can also be referred to as a point cloud), and the radar tensor is processed to detect and classify objects in the environment. For instance, the radar tensor includes power measurements generated by the radar sensor along different dimensions, such as Doppler, range, azimuth, and elevation. The radar tensor is then further processed to detect, classify, and track objects in the scene over time. As radar systems increase in popularity and are included in more and more vehicles, interference may become increasingly problematic (where a radar signal emitted from one vehicle may be detected by a radar system of another vehicle). While conventional approaches allow for objects to be detected, classified, and tracked over time, these approaches have not satisfactorily addressed problems created by interference and noise with regard to false-positive detections and false alarm rate stability.

SUMMARY

The following is a brief summary of subject matter that is described in greater detail herein. This summary is not intended to be limiting as to the scope of the claims.

Described herein are various technologies relating to radar systems, and more specifically, radar systems employed in autonomous vehicles, aircraft, watercraft, and the like. With more particularity, various technologies described herein facilitate providing a dynamic probability of false alarm (PFA) thresholding technique that maintains a percentage of false alarms at a desired level despite variations in mean noise power variance.

As the number of autonomous vehicles and the radar systems deployed thereon increases in a given environment, interference between different vehicles radar systems becomes a serious issue and can impede efforts to provide active safety functionality. Interference can significantly affect the performance of the radar system, especially the false positive and false negative detection rates. For example, interference can cause false alarms and increase the noise level, making the radar system miss real detections.

Constant false alarm rate (CFAR) radar systems employ a technique that is used to mitigate the effects of radar interference. Interference can cause false alarms (detections) in radar systems, leading to reduced accuracy and reliability. CFAR algorithms adjust the detection threshold of the radar system based on the local noise level, which helps to reduce the impact of interference on the radar system. In CFAR systems, the detection threshold is set based on the local noise level, which is determined by averaging the noise power within each cell on a frame-by-frame basis. This approach ensures that the probability of false alarms is constant over the entire detection range, regardless of the noise and clutter levels in the surrounding environment. As a result, CFAR can improve the accuracy and reliability of target detection while minimizing false alarms and reducing the impact of interference.

CFAR radars are designed to determine the noise power threshold above which a radar return can be considered to have a high likelihood of originating from a real target, as opposed to a spurious source. If this threshold is too low, more real targets will be detected, but there will also be increased numbers of false alarms. Conversely, if the threshold is too high, there will be fewer false alarms, but real targets can also be missed. In most radar detectors, the threshold is set to achieve a desired probability of false alarm (PFA) (e.g., 3%, 4% 5% or some other predetermined percentage), or, similarly, a false alarm rate or time between false alarms. For example, if the PFA is set to 4%, then there is a 96% likelihood that a given detection represents a real target (i.e., the detection is not false). However, during an interference event, it is not always just the radar noise level that changes, e.g., due to properties of correlation, saturation, etc. Other characteristics of the noise distribution can change as well, and when this happens the CFAR radar may not perform as expected.

Accordingly, systems and methods are described herein that facilitate providing a probability of false alarm (PFA) threshold offset that is based on noise variance calculated on a frame-by-frame basis. In one embodiment, the noise variance is calculated based on a standard deviation of the mean noise power for each frame (i.e., on a frame-by-frame basis).

According to one aspect, for a given radar cell, on a per-frame basis, training cells are selected and used to estimate noise power for the given cell. A mean noise power value is calculated based on noise power values from the training cells. In one embodiment, cells neighboring the given cell are selected as training cells. Additionally, training cells can be selected based on the amount of noise detected and whether the amount of noise is similar to the cell for which the threshold offset is being calculated.

A standard deviation of the noise power for the given cell is calculated based on the mean noise power value. An object detection probability threshold $P_x$ is calculated based on a desired PFA rate. For example, if the permissible probability of false alarm (PFA) is set to 5%, then the object detection probability threshold $P_x$ is calculated as $P_x=1-$PFA, or 95%. A trained threshold offset is then calculated, and a comparison is made between a current threshold offset and the calculated trained threshold offset. If the current threshold offset is greater, then the current threshold offset is left unchanged. If the current threshold offset is not greater, then the current threshold offset is adjusted to the trained threshold offset value. In this manner, a dynamically adjustable threshold offset value based on noise power variance is provided.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Figure 1:
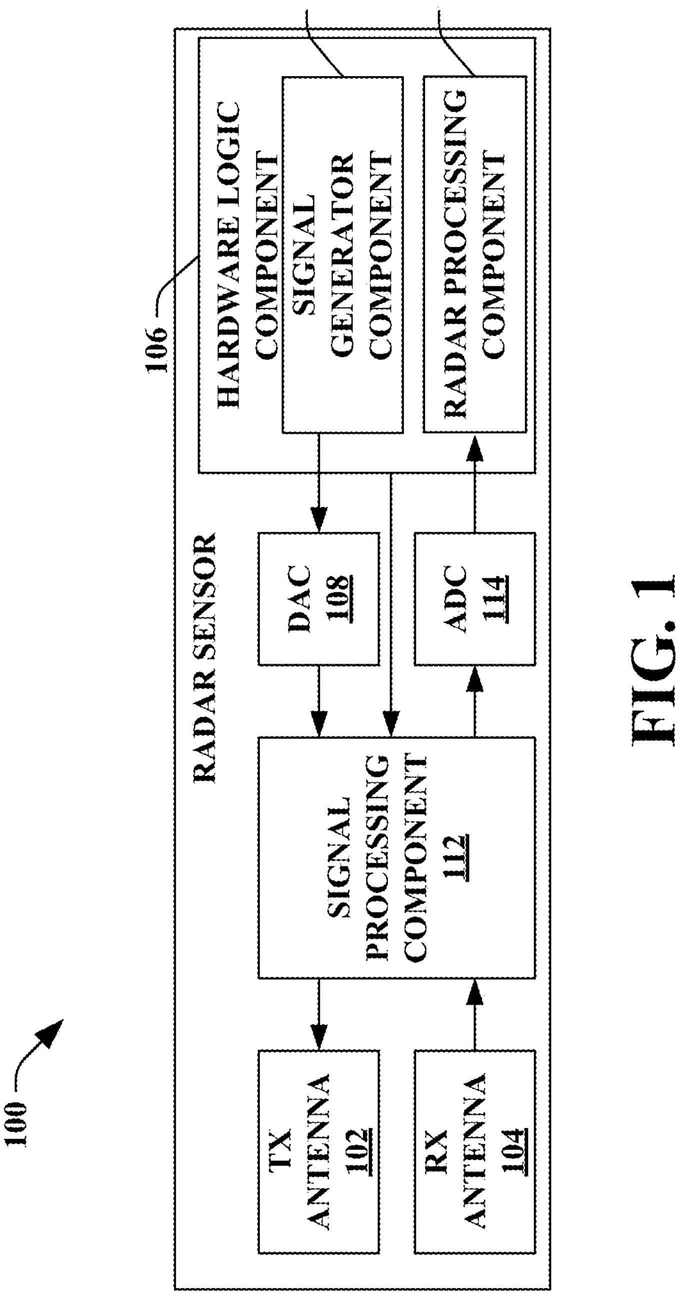
FIG. 1 is a functional block diagram of an exemplary radar sensor.

Various technologies pertaining to automated vehicle (and other) radar systems are described herein. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Further, as used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. Further, as used herein, the term "exemplary" is intended to mean serving as an illustration or example of something and is not intended to indicate a preference.

To provide improved object detection, classification, and tracking in connection with a radar sensor, the described aspects provide a provide a CFAR dynamic offset threshold technique, where the threshold used for the CFAR is calculated according to a noise distribution model estimated based on the radar noise power at a given instant, e.g., on a frame-by-frame basis. A dynamic offset threshold is estimated through a PFA of the noise generated by the radar itself. The noise PFA present in the radar is modeled and a correct threshold adjustment is estimated based on the noise model. In this way, any change in noise distribution (variance) caused by interference, saturation, etc., is modeled and taken into account in the threshold value used in the CFAR. False alarms that come from non-correlated interference (e.g., any interference that increases noise) can be filtered out.

By way of example, in which the background against which targets are to be detected is assumed to be constant with time and space for simplicity of explanation. A fixed threshold level can be chosen that provides a specified probability of false alarm governed by a probability density function of the noise, which in this example is assumed to be Gaussian. The probability of detection is then a function of the signal-to-noise ratio (SNR) of the target return. However, in fielded systems, unwanted clutter and interference sources cause the noise level to change both spatially and temporally. Accordingly, the described systems and methods provide a dynamic PFA threshold offset, where the threshold offset level is raised and lowered to maintain a constant probability of false alarm when performing constant false alarm rate (CFAR) detection.

Interference in radar system can cause a noise increase in the radar estimation. In a fixed-threshold detector, the PFA can be sensitive to the noise mean power and its statistics. In CFAR detectors, the noise (or background) mean power is continuously estimated, and the threshold is adapted according to this estimate in order to maintain a predetermined PFA. However, in interference situations, it is not only mean noise power that increases/changes, but also other characteristics of the noise such as variance change, and then the standard CFAR techniques (CFAR, CA-CFAR, etc.) based on adapted threshold using mean noise power lose performance and cannot provide the PFA expected.

An interference event can not only increase the radar noise level due to properties of correlation, saturation, etc., but the entire shape of the noise power curve can change, and then the thermal noise model used in CFAR does not perform as expected. According to an aspect described herein, a model of the noise power can be approximated in each measurement so that frames affected by interference have an accurate noise model and the PFA is maintained constant.

In conventional CFAR techniques, the mean of the noise power is used to model the noise. However, the noise power mean is only one parameter that can be used to represent the noise distribution. Additional statistics can also be estimated and can assist in the noise model representation. One such additional statistic that can be estimated is the noise variance or distribution. The variance is a parameter that represents how the noise points are distributed in relation to the mean. A constant offset relative to the mean creates a non-constant false alarm rate in situations where the variance of the noise changes. This can happen for different reasons, such as interference, saturation, temperature, etc. Accordingly, the subject systems and methods use the variance of noise power in order to determine a dynamic threshold offset that provides a stable PFA for the radar system.

With reference now to FIG. 1, an exemplary radar sensor (also referred to as a radar system) 100 is illustrated, in which various features, circuits, etc. described herein can be employed. The radar sensor 100 includes a transmit antenna 102, a receive antenna 104, and a hardware logic component 106. Briefly, the hardware logic component 106 is configured to prepare radar signals that are transmitted by the transmit antenna 102, and to compute target solutions indicating estimated positions and/or velocities of objects based upon radar returns and/or other radar signals received by the receive antenna 104. In exemplary embodiments, various components of the radar sensor 100 can be integrated as a same system-on-a-chip (SoC). In various embodiments, the radar sensor 100 can be employed on a vehicle, such as a land vehicle, an aircraft, to identify positions and velocities of objects in the operational environment of the vehicle.

The radar sensor 100 further comprises one or more DACs 108. The hardware logic component 106 comprises a signal generator component 110 that prepares radar signals for transmission by way of the transmit antenna 102. The signal generator component 110 is configured to control the DAC 108 to cause the DAC 108 to generate an analog radar signal for transmission by the transmit antenna 102. In other words, the signal generator component 110 generates digital values that, when received by the DAC 108, cause the DAC 108 to output an analog radar signal having various desired signal characteristics. Hence, the radar sensor 100 is configured as a digitally modulated radar sensor, wherein characteristics of radar signals output by the transmit antenna 102 are digitally controlled by the signal generator component 110 of the hardware logic component 106. For example, the signal generator component 110 can be configured to control the DAC 108 such that the radar sensor operates as a phase modulated continuous wave (PMCW) radar sensor.

The radar sensor 100 further includes an analog signal processing component 112. The signal processing component 112 is generally configured to perform various analog signal processing operations on analog signals that are to be output by the transmit antenna 102 and/or that are received by the receive antenna 104. By way of example, and not limitation, the signal processing component 112 can amplify a radar signal output by the DAC 108 to increase the power of the radar signal prior to transmission by way of the transmit antenna 102. In a further example, the signal processing component 112 can be configured to mix a radar signal output by the DAC 108 with a carrier signal to shift a center frequency of the radar signal. The signal processing component 112 can include any of various components that are configured to perform these various functions. For example, the signal processing component 112 can include mixers, amplifiers, filters, or the like. Functionality of the signal processing component 112 and its constituent components can be controlled by the hardware logic component 106. The transmit antenna 102 receives processed radar signals from the signal processing component 112 and emits the radar signals into an operational environment of the radar sensor 100.

The receive antenna 104 receives radar returns from the operational environment. In exemplary embodiments, the radar returns received by the receive antenna 104 comprise reflections, from objects in the operational environment of the sensor 100, of radar signals emitted by the transmit antenna 102. It is to be understood that the radar returns received by the receive antenna 104 can further include reflections of radar signals emitted by other radar emitters that are active within the operational environment of the radar sensor 100. As will be described in greater detail below, the technologies described herein can reduce transmitter leakage and receiver saturation by hopping between frequency subbands used for transmission and receiving. Responsive to receipt of radar returns from the operational environment of the sensor 100, the receive antenna 104 outputs an electrical signal that is indicative of the received radar returns. This electrical signal is referred to herein as a radar signal and is transmitted along one or more transmission lines in the radar sensor 100, as distinct from radar returns that are received by the receive antenna 104 as radiated signals propagating through air or free space in the operational environment of the radar sensor 100.

The signal processing component 112 receives a radar signal from the receive antenna 104. The signal processing component 112 is configured to perform various analog signal processing operations over radar signals received from the receive antenna 104. By way of example, and not limitation, the signal processing component 112 can perform various mixing, filtering, and amplification operations on radar signals output by the receive antenna 104. The signal processing component 112 can be configured to perform various of these signal processing operations (e.g., mixing) based further upon a radar signal transmitted by the transmit antenna 102.

The radar sensor 100 further comprises one or more ADCs 114 that receives a processed radar signal from the signal processing component 112. The ADC 114 digitally samples the radar signal and outputs digital values that are indicative of amplitude of the radar signal over time. These digital values are collectively referred to herein as radar data. The radar data output by the ADC 114 are indicative of the radar returns received by the receive antenna 104.

The hardware logic component 106 receives the radar data from the ADC 114. The hardware logic component 106 further comprises a radar processing component 116. The radar processing component 116 is configured to compute positions and/or velocities of targets in the operational environment of the radar sensor 100 based upon the radar data. In a non-limiting example, the radar processing component 116 can compute a range, a bearing, and/or a velocity of a target in the operational environment of the sensor 100 based upon the radar data.

Figure 2:
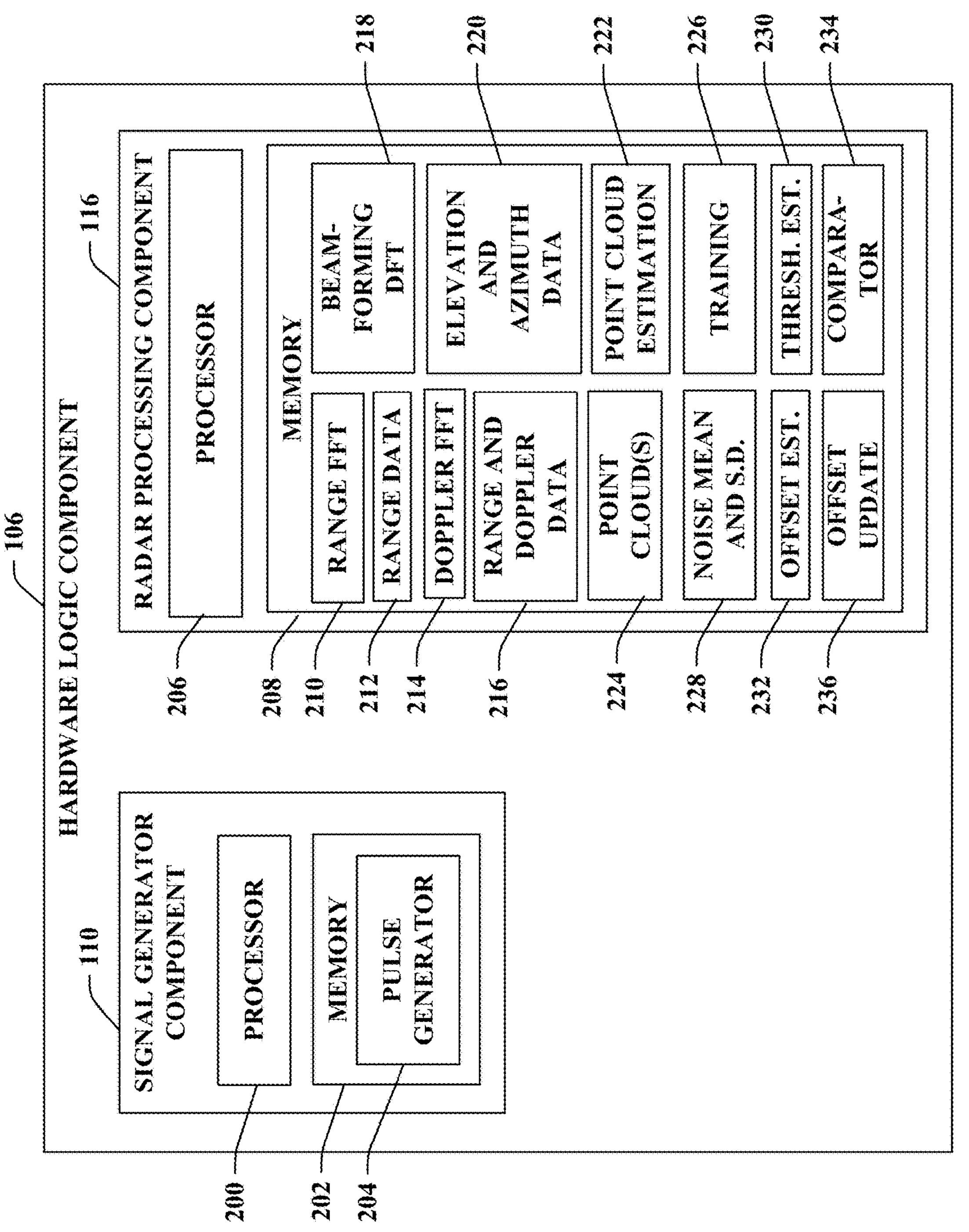
FIG. 2 illustrates a more detailed view of the hardware logic component.

With reference now to FIG. 2, a more detailed view of the hardware logic component 106 is illustrated. The hardware logic component 106 comprises the signal generator component 110 and the radar processing component 116, as discussed with regard to FIG. 1. The signal generator component 110 comprises a processor 200 and a memory 202 configured to provide certain functionality as described herein. For example, the memory 202 can store computer-executable instructions that, when executed by the processor 200, cause the signal generator component 110 to perform certain acts. The memory 202 comprises a ramp/pulse generator component 204 that generates ramps/pulses (depending on the type of radar system) for transmission. In one embodiment, the ramp/pulse generator component 204 performs time division multiplexing and/or frequency division multiplexing on the signals to be transmitted.

The radar processing component 116 comprises a processor 206 and a memory 208 configured to provide certain functionality as described herein. For example, the memory 208 can store computer executable instructions that, when executed by the processor 206, cause the radar processing component 116 to perform certain acts. The memory 208 comprises a range fast Fourier transform (FFT) component 210 that is executed on a digitized signal received from an ADC, such as the ADC 114 of FIG. 1, to generate range data values 212 for objects detected in a received radar return. A Doppler FFT 214 is executed on the range values to generate range and Doppler data values 216. A discrete Fourier transform (DFT) 218 is then executed on the range and Doppler data values to generate elevation and azimuth data values 220. A point cloud estimation component 222 is executed to generate one or more multi-dimensional point clouds (radar tensors) 224 representing at least the range data values 212, the range and Doppler data values 216, and the elevation and azimuth data values 220.

The memory further comprises a training component 226 that selects training cells that are used to estimate noise power in a given cell in which the threshold offset will be applied. Selection of the training cells is described in greater detail with regard to FIG. 7. Once the noise power of the given cell is modeled, a noise power mean and standard deviation calculation component 228 respectively calculate the noise power mean and the standard deviation or variants of the noise power. A threshold estimate component 230 estimates the power threshold (e.g., in decibels; also referred to herein as a PFA threshold) above which target detections are considered valid, and below which detections are considered noise. An offset estimation component 232 calculates the trained threshold offset based on the noise power mean and variance. A comparator component 234 compares a current (e.g., predetermined) PFA threshold offset for the given cell to the trained threshold offset. The current PFA threshold offset may be factory-set, set during a calibration of the radar sensor, etc. If the current PFA threshold offset is greater than the trained threshold offset plus a flexible offset value, then the current threshold offset can be retained for the subsequent frame. In another embodiment, the current threshold offset is not retained, and a new threshold offset is calculated for the subsequent frame. The flexible offset value can be anywhere from 0-N decibels, where N is a real number. If the current PFA threshold offset is not greater than the trained threshold offset plus the flexible offset value, then the current threshold offset is adjusted to the trained threshold offset level by a threshold offset update component 236.

The flexible offset value is a parameter that works as a guard interval offset so that guard interval offset, which provides flexibility in the offset adjustment for cases where it may be undesirable to change the threshold for small increases in the variance. For example, if the trained threshold is 3 dB, the flexible offset (also referred to herein as a guard interval offset) can be set to, e.g., 0.5 dB. In this case, the new PFA threshold offset will be applied if it is at least 3.5 dB greater than the current PFA threshold offset.

In another embodiment, the point cloud 224 (or raw radar data) is transmitted to a central network computer or system (not shown in FIG. 2; see FIG. 3) for additional processing, including the training, noise power mean and standard deviation calculations, threshold estimation, offset estimation, offset comparison, and offset update processing steps performed by components 226-236.

In another embodiment, the system can use the threshold offset calculated based on the variance in each frame, without employing a trained threshold offset. In this case, in each frame, the radar system estimates the variance and uses it to calculate the threshold offset to be used. The standard deviation, variance, and mean of the absolute difference absolute value of the mean can be employed to calculate the threshold offset to be used. The mean of the absolute difference provides a low cost, linear alternative, where the mean of the difference between the noise power of respective training cells and the mean noise power across all training cells is calculated and used when calculating the threshold offset. For instance, mathematically, this can be represented as: mean (abs (magTrainingCells−meanPower)).

With continued reference to FIGS. 1 and 2, in conventional CFAR radar, the detection threshold is set based on the local noise level, which is determined by averaging the noise within each cell. This approach ensures that the probability of false alarms is constant over the entire detection range, regardless of the noise power and clutter levels in the surrounding environment. However, if the radar noise power has a different variance than the one used in the CFAR design, the CFAR radar will not distinguish between noise and a real target. Therefore, the described systems and methods provide a dynamic offset threshold that is estimated through the probability of false alarm (PFA) of the noise generated by the radar. In this way, any change in noise power distribution caused by interference, saturation, etc., is modeled and taken into account in the threshold offset value used in the CFAR radar, in order to maintain the desired PFA.

The described techniques can be used in any type of CFAR radar and in any type of threshold detector. Initially, training cells are selected, which are the radar cells used to estimate noise power. These can be neighboring range cells, doppler cells, angle cells, or any combination of the foregoing. The training cells are selected to provide a good representation of the noise in the area where the threshold and/or offset is to be applied. The number of training cells is selected to be sufficient for calculating the mean and variance of the noise power level in a manner that approximates the mean and variance of the noise power level across infinity cells. Determination of the minimum number of cells can be performed, e.g., with offline processing, where the minimum number of cells is selected so that the estimated mean and variance approximate the mean and variance values estimated across infinity cells. In one embodiment, the minimum number of training cells is on the order of 5 to 20 cells, although other numbers of training cells may be employed.

Once the training cells are defined, the standard threshold offset used by the radar sensor in normal operations is estimated. This can be done using a noise power cumulative distribution function (CDF). After defining the standard offset threshold, an estimation is made of the radar noise power variance present in the data used to estimate the standard threshold offset. The estimation of the radar noise power variance represents the standard noise power variance present in the system. The foregoing steps may be performed offline, or online in real time, or a combination of both.

The calculation of the mean noise power in the given cell is made by averaging the signal level in neighboring training cells. Once the mean is calculated, the noise power variance of the training cells is estimated. This variance value is compared to the standard noise power variance, and if the difference is larger than a predefined threshold, the new calculated threshold offset is used. In this manner, the radar has a more accurate and stable constant false alarm rate. To decrease the contribution of targets present in neighboring cells in the calculation of the noise mean and variance, or both, a clipping technique can be used to attenuate the amplitude of isolated points exhibiting large magnitude in the radar return.

A code snippet is provided below as an example of the manner in which the described techniques can be practically applied in a radar system:

```
meanNoise = mean((cellsTrainingdB));
sigmaNoise= sqrt(var(abs((cellsTrainingdB-meanNoise))));
%% Threshold Estimation
Px = 1 − Pfa;
%% inv. CDF for Noncoherent Integration with noise floor
include
offseTh = sigmaNoise=*sqrt(2)*(erfinv(2*Px − 1)) + meanNoise
if offseTh> offseThTrained + guardintervaloffset
threshold = offseTh
else
threshold = offseThTrained
End
```

Figure 3:
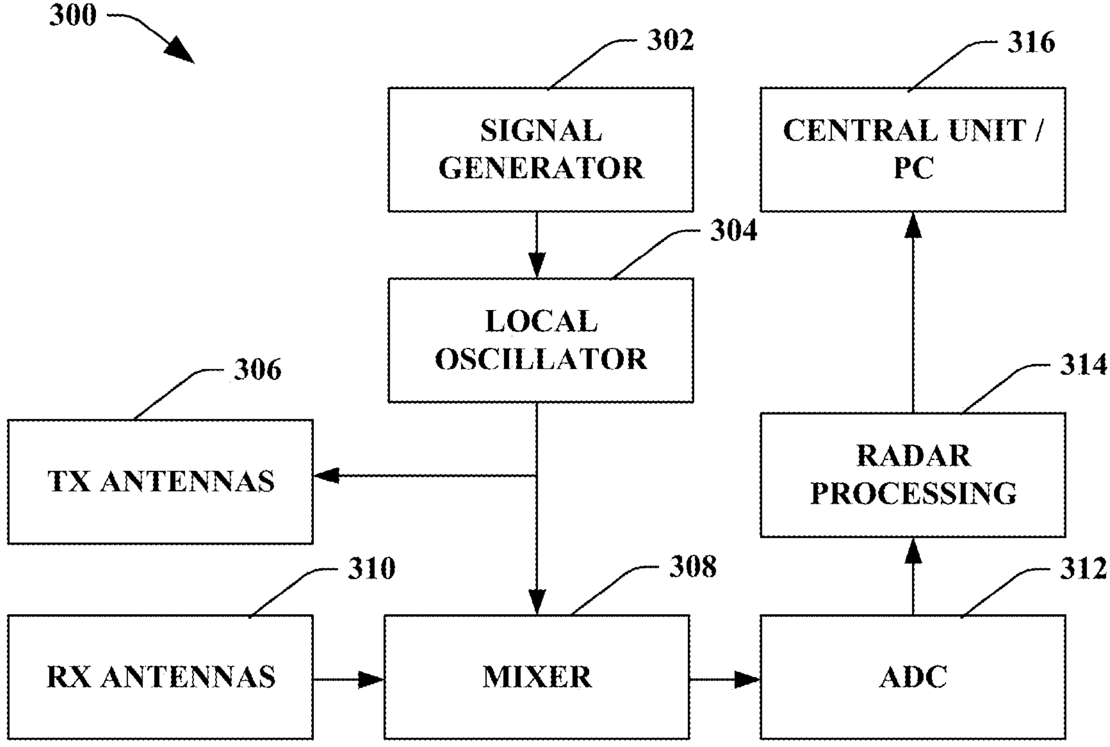
FIG. 3 shows another example of a radar sensor unit.

FIG. 3 shows another example of a radar sensor unit 300. In contrast to the embodiments described with regard to FIGS. 1 and 2, where signal processing is performed at the radar unit, in the example of FIG. 3, signal processing at the radar sensor terminates with generation of the point clouds, which are then transmitted to a central processing unit or computer where they are processed further. The sensor 300 comprises a signal generator 302 that provides a signal to a local oscillator 304. The local oscillator 304 adjusts the signal for transmission via one or more transmit antennas 306. The local oscillator 304 also provides the transmit signal to a mixer 308, which combines the transmit signal with signals that have been reflected by an object and received by one or more receive antennas 310. The combined signal is then provided by the mixer 308 to an ADC 312, which digitizes the combined signal and provides the digitized signal to a radar processing component 314.

The radar processing unit 314 performs various acts on the digitized signal and provides functionality similar or identical to the functionality provided by the radar processing component 116 of the hardware logic component 106 (see, e.g., FIGS. 1 and 2). The radar processing component 314 generates one or more multi-dimensional point clouds, which are then transmitted to a central processing unit or computer (PC) 316 for additional processing.

Figure 7:
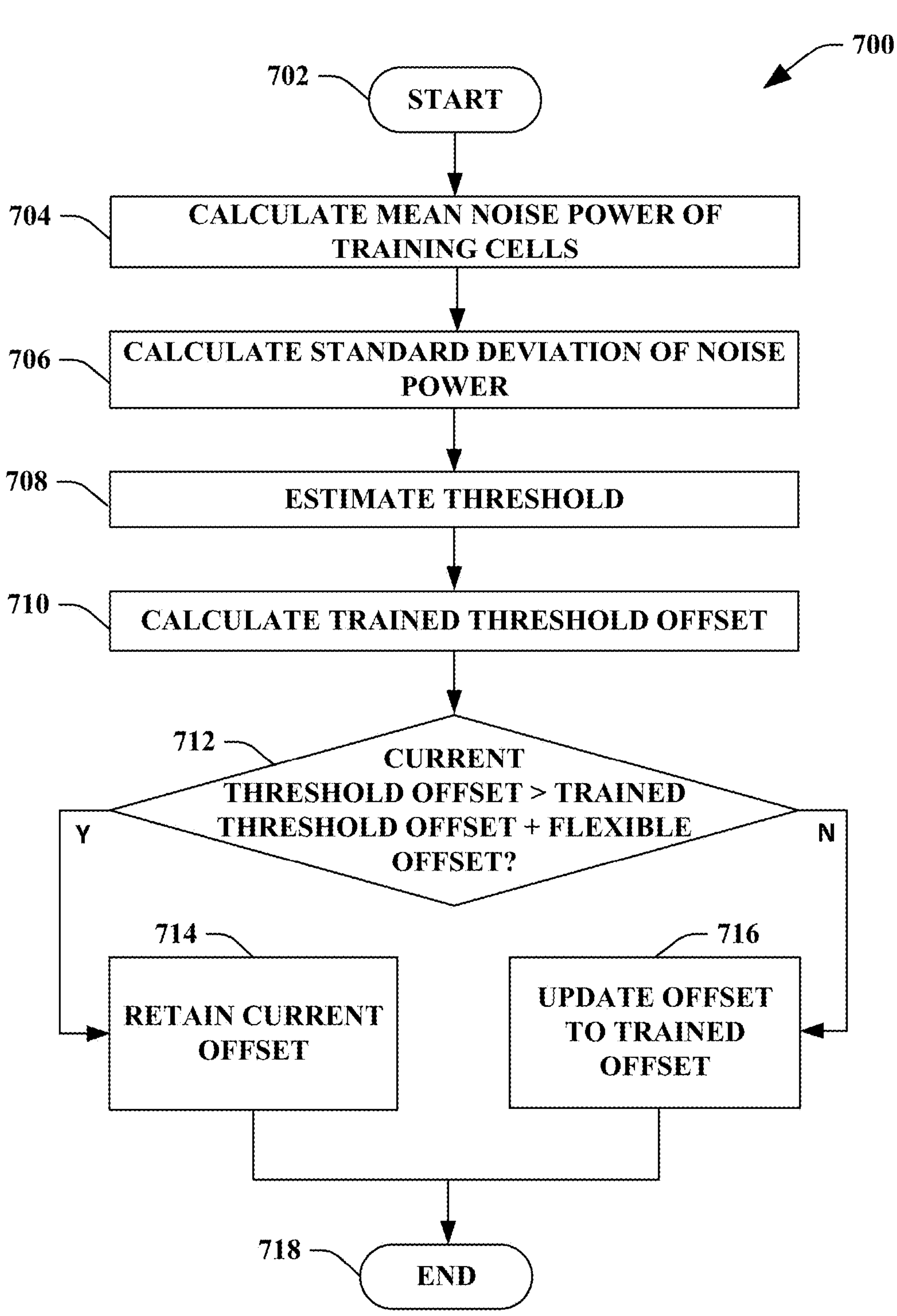
FIG. 7 illustrates a methodology for dynamically updating a threshold offset based on a calculated noise power variance value.

In one embodiment, the central processing unit 316 performs the post-point could processing steps described with regard to the radar processing component 116 of FIG. 2 and/or executes the method of FIG. 7. In another embodiment, the central processing unit 316 receives raw radar data from a radar sensor and processes the raw data to provide the functionality described herein.

Figures 4, 5:
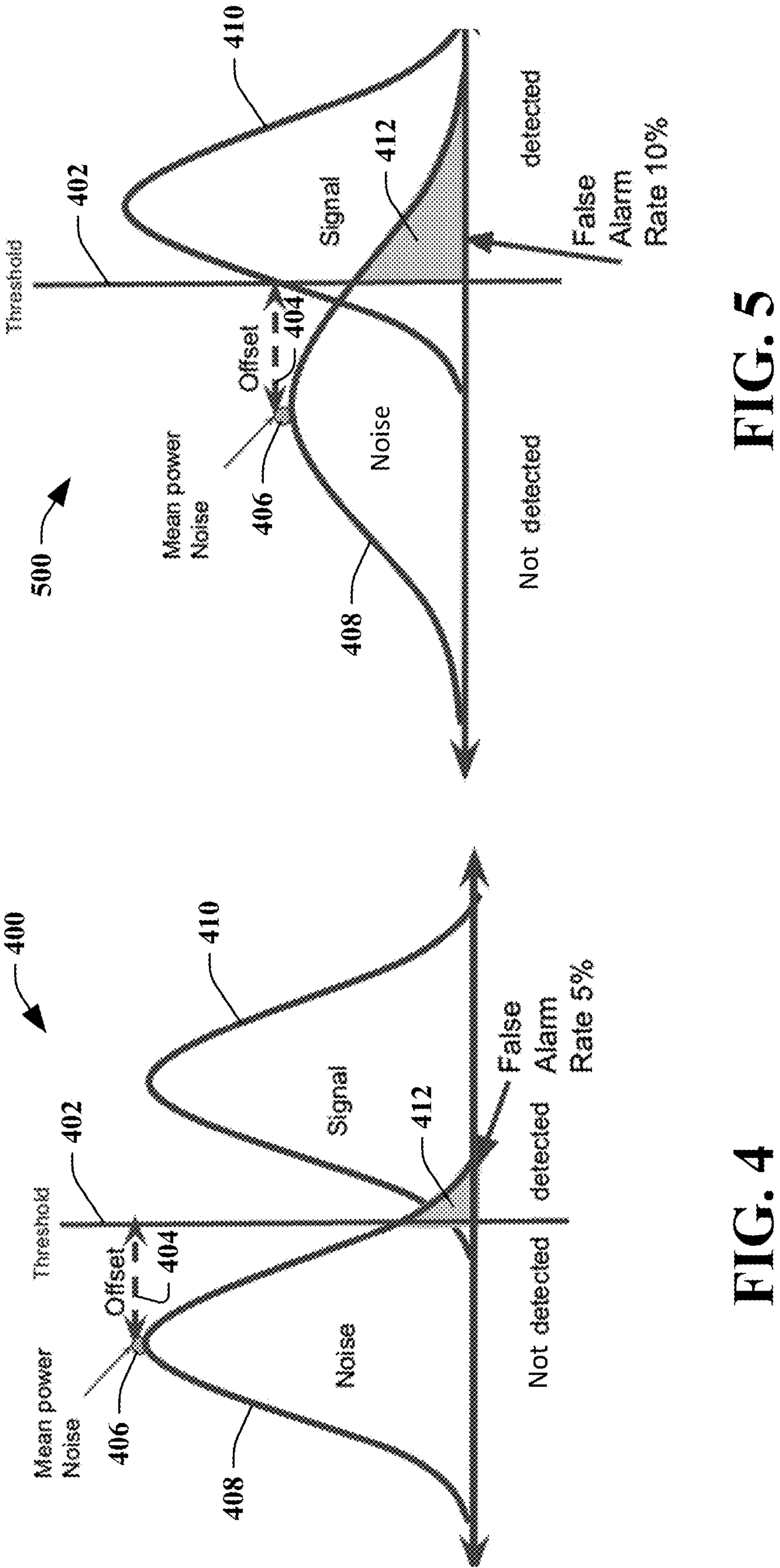
FIG. 4 illustrates a graph showing a PFA threshold that is offset from a mean noise power value.
FIG. 5 shows a graph in which the threshold and offset have not been changed, but wherein the gaussian distribution (variance) of the noise power curve has changed, resulting in a higher PFA.

FIG. 4 illustrates a graph 400 showing a threshold 402 with an offset 404 by which the threshold 402 is offset from it mean noise power value 406. The threshold 402 is set to maintain a false alarm rate of 5% (according to the illustrated example; other PFA rates are also possible). Below the threshold 402, radar hits are not detected and/or are disregarded as noise. Above the threshold 402, radar hits are detected in the signal 410 with a 95% probability of being real targets. A small portion 412 of the noise power curve 408 is above the threshold 402 and may cause false detections at the desired rate of 5%.

Turning now to FIG. 5, a graph 500 is illustrated in which the threshold 402 and offset 404 have not been changed, but wherein the gaussian distribution of the noise power curve 408 has changed. The graph 500 illustrates the problem with using mean noise power 406 to offset the false alarm rate threshold 402. As can be seen, the portion 502 of the noise power curve 408 that extends beyond the threshold 402 and overlaps the signal 410 is larger than that shown in FIG. 4, resulting in a false alarm rate of 10%, which is above the desired false alarm rate of 5%. To solve this problem and overcome the deficiencies of techniques that use mean noise power to offset the PFA threshold, the herein described techniques use noise power variance, as illustrated in FIG. 6.

Figure 6:
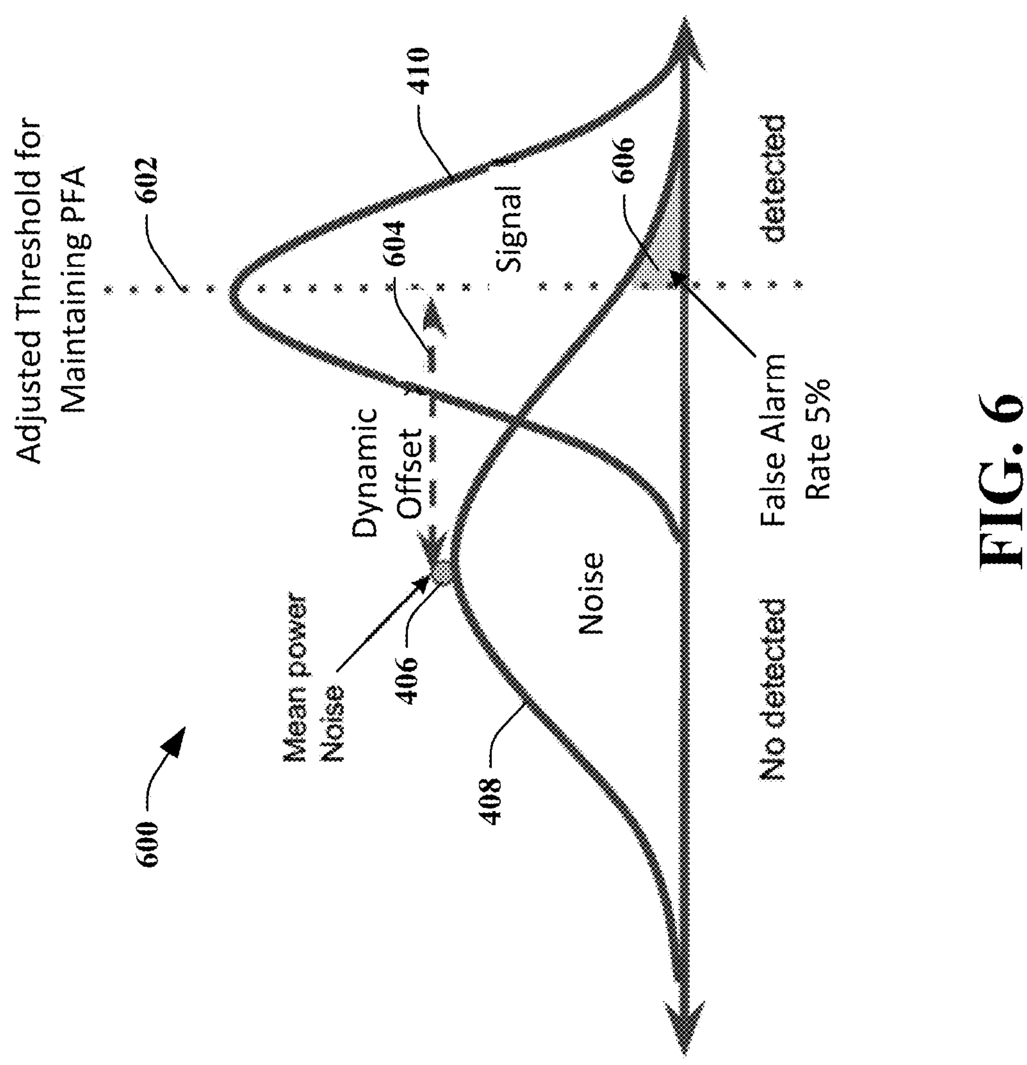
FIG. 6 illustrates a graph with an adjusted threshold offset for maintaining a desired PFA despite the change in the shape of the noise power curve.

FIG. 6 illustrates a graph 600 with an adjusted threshold 602 for maintaining a desired PFA (e.g., 5% in the illustrated example) using a dynamic offset 604 to offset the threshold 602 from the mean noise power 406 despite the change in the shape of the noise power curve 408. As can be seen, the portion 606 of the noise power curve 408 that is above the threshold 602 is substantially smaller than the portion 502 shown in FIG. 5.

FIG. 7 illustrates an exemplary methodology relating to providing a dynamically adjustable threshold offset based on noise variance. While the methodology is shown and described as being a series of acts that are performed in a sequence, it is to be understood and appreciated that the methodology is not limited by the order of the sequence. For example, some acts can occur in a different order than is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodology can be stored in a computer-readable medium, displayed on a display device, and/or the like.

Turning now solely to FIG. 7, a methodology 700 is illustrated for dynamically updating a threshold offset based on a calculated noise power variance value. The method begins at 702. At 704, a mean noise power value is calculated based on noise power values from multiple training cells. For example, for a given range cell, Doppler and/or angle cells or data values associated with the given range cell can be selected, and their noise power values are averaged to determine the mean noise power for the given range cell. In another embodiment, for a given Doppler cell, range and/or angle cells or data values associated with the Doppler cell can be used to calculate the mean noise power for the given Doppler cell. Similarly, for a given angle cell, range and/or Doppler cells or data values associated with the given angle cell can be used to calculate the mean noise power for the given angle cell. In another embodiment cells neighboring the given cell can be selected as training cells.

In one example, the number of training cells selected is on the order of e.g., 5-10 training cells. In another example, the number of training cells selected is on the order of 10s or 20s of training cells, or more. Additionally, training cells can be selected based on the amount of noise detected and whether the amount of noise is similar to the cell for which the threshold offset is being calculated.

At 706, a standard deviation of the noise power for the given cell is calculated based on the mean value calculated at 704. At 708, the object detection probability threshold $P_x$ is estimated or calculated. For example, if the permissible probability of false alarm (PFA) is set to 6%, then the object detection probability threshold $P_x$ is calculated as $P_x = 1-$ PFA, or 94%.

At 710, a trained threshold offset value is calculated. In one embodiment, this step involves an inverse cumulative distribution function (CDF) and/or an inverse error function when calculating the trained threshold offset from the noise variance, as set forth in the code snippet described above.

At 712, a comparison is made to determine regarding whether a current threshold offset is greater than the sum of the calculated trained threshold offset and a guard interval offset value. If the current threshold offset is greater than the sum of the trained threshold offset and the flexible offset value at 712, then at 714, then the current threshold offset is left unchanged. If the current threshold offset is not greater than the sum of the trained threshold offset and the flexible offset value at 712, then at 716, the current threshold offset is adjusted to the trained threshold offset value. The method terminates at 718.

In one or more embodiments, the method of FIG. 7 can be executed, performed, etc., by any of the systems, components, processors, etc., of FIGS. 1-3, 8, and/or 9, and/or any combination(s) thereof.

Figure 8:
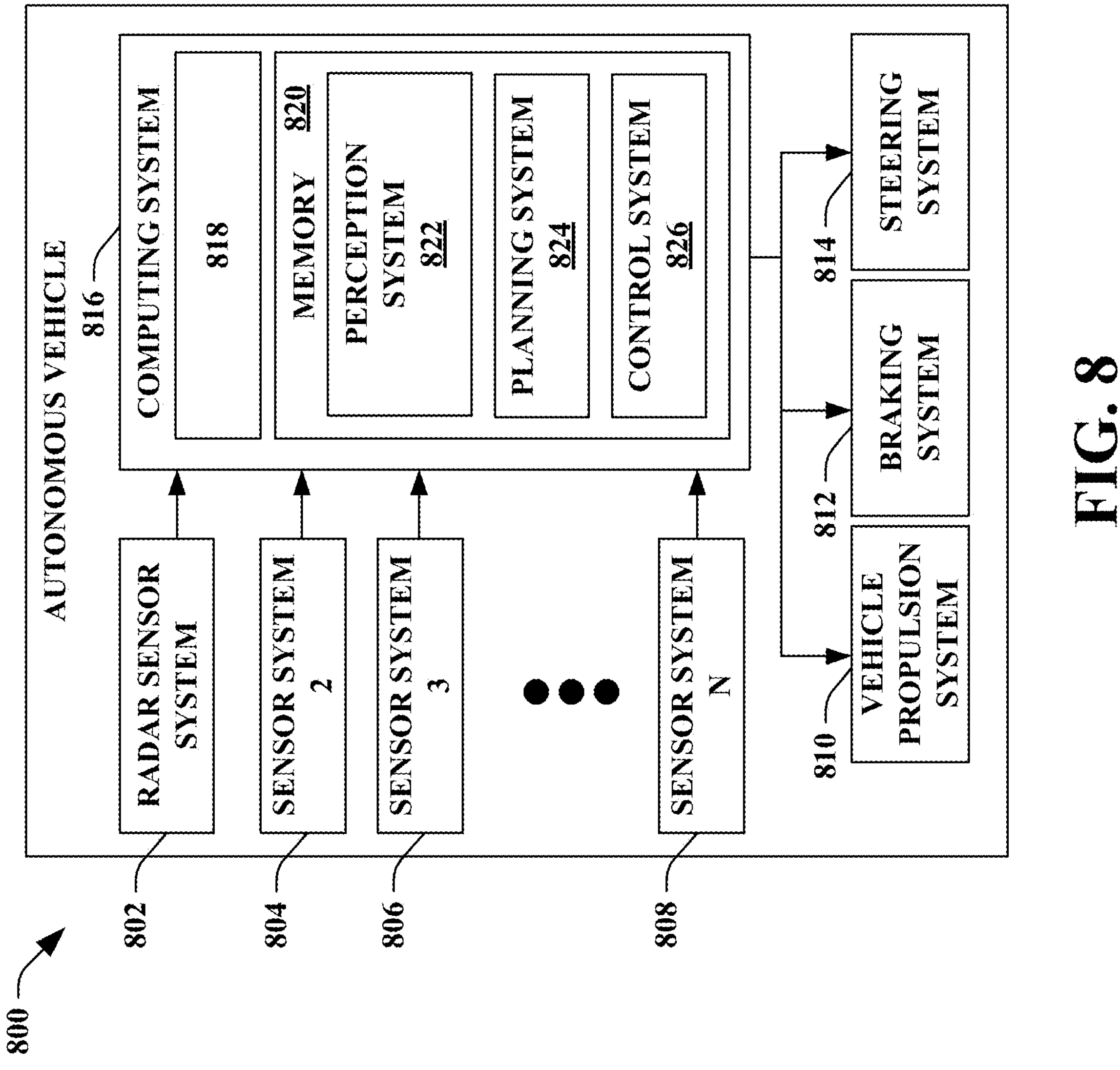
FIG. 8 is a functional block diagram of an exemplary AV.

Various technologies described herein are suitable for use in connection with an autonomous vehicle (AV) that employs a radar system to facilitate navigation about roadways. Referring now to FIG. 8, an exemplary AV 800 is illustrated, wherein the AV 800 can navigate about roadways without human conduction based upon sensor signals output by sensor systems of the AV 800. The AV 800 includes a plurality of sensor systems 802-808 (a first sensor system 802 through an Nth sensor system 808). The sensor systems 802-808 may be of different types. For example, the first sensor system 802 is a radar sensor system, the second sensor system 804 may be a LiDaR sensor system, the third sensor system 806 may be a camera (image) system, and the Nth sensor system 808 may be a sonar system. Other exemplary sensor systems include GPS sensor systems, inertial sensor systems, infrared sensor systems, and the like. The various sensor systems 802-808 are arranged about the AV 800. The sensor systems 802-808 are configured to repeatedly (e.g., continuously, or periodically) output sensor data that is representative of objects and conditions in the driving environment of the AV 800.

The AV 800 further includes several mechanical systems that are used to effectuate appropriate motion of the AV 800. For instance, the mechanical systems can include but are not limited to, a vehicle propulsion system 810, a braking system 812, and a steering system 814. The vehicle propulsion system 810 may be an electric engine, an internal combustion engine, or a combination thereof. The braking system 812 can include an engine brake, brake pads, actuators, a regenerative braking system, and/or any other suitable componentry that is configured to assist in decelerating the AV 800. The steering system 814 includes suitable componentry that is configured to control the direction of movement of the AV 800.

The AV 800 additionally comprises a computing system 816 that is in communication with the sensor systems 802-808 and is further in communication with the vehicle propulsion system 810, the braking system 812, and the steering system 814. The computing system 816 includes a processor 818 and memory 820 that includes computer-executable instructions that are executed by the processor 818. In an example, the processor 818 can be or include a graphics processing unit (GPU), a plurality of GPUs, a central processing unit (CPU), a plurality of CPUs, an application-specific integrated circuit (ASIC), a microcontroller, a programmable logic controller (PLC), a field programmable gate array (FPGA), or the like.

The memory 820 comprises a perception system 822, a planning system 824, and a control system 826. Briefly, the perception system 822 is configured to identify the presence of objects and/or characteristics of objects in the driving environment of the AV 800 based upon sensor data output by the sensor systems 802-808. The planning system 824 is configured to plan a route and/or a maneuver of the AV 800 based upon data pertaining to objects in the driving environment that are output by the perception system 822. The control system 826 is configured to control the mechanical systems 812-814 of the AV 800 to effectuate appropriate motion to cause the AV 800 to execute a maneuver planned by the planning system 824.

The perception system 822 is configured to identify objects in proximity to the AV 800 that are captured in sensor signals output by the sensor systems 802-808. By way of example, the perception system 822 can be configured to identify the presence of an object in the driving environment of the AV 800 based upon images generated by a camera system included in the sensor systems 804-808. In another example, the perception system 822 can be configured to determine a presence and position of an object based upon radar data output by the radar sensor system 802. In exemplary embodiments, the radar sensor system 802 can be or include the radar sensor 80 and/or 300. In such embodiments, the perception system 822 can be configured to identify a position of an object in the driving environment of the AV 800 based upon the estimated range output by the radar sensor 80 and/or 300.

The AV 800 can be included in a fleet of AVs that are in communication with a common server computing system. In these embodiments, the server computing system can control the fleet of AVs such that radar sensor systems of AVs operating in a same driving environment (e.g., within line of sight of one another, or within a threshold distance of one another) employ different pulse sequence carrier frequencies. In an exemplary embodiment, a radar sensor system of a first AV can be controlled so as not to transmit pulse sequences having same center frequencies as pulse sequences transmitted by a radar sensor system of a second AV at the same time. In further embodiments, the radar sensor system of the first AV can be controlled to transmit pulse sequences in a different order than a radar sensor system of a second AV. For instance, the radar sensor system of the first AV can be configured to transmit a set of pulse sequences at four different center frequencies A, B, C, and D in an order A, B, C, D. The radar sensor system of the second AV can be configured to transmit pulse sequences using a same set of center frequencies in a frequency order B, A, D, C. Such configurations can mitigate the effects of interference when multiple AVs that employ radar sensor systems are operating in a same driving environment.

Figure 9:
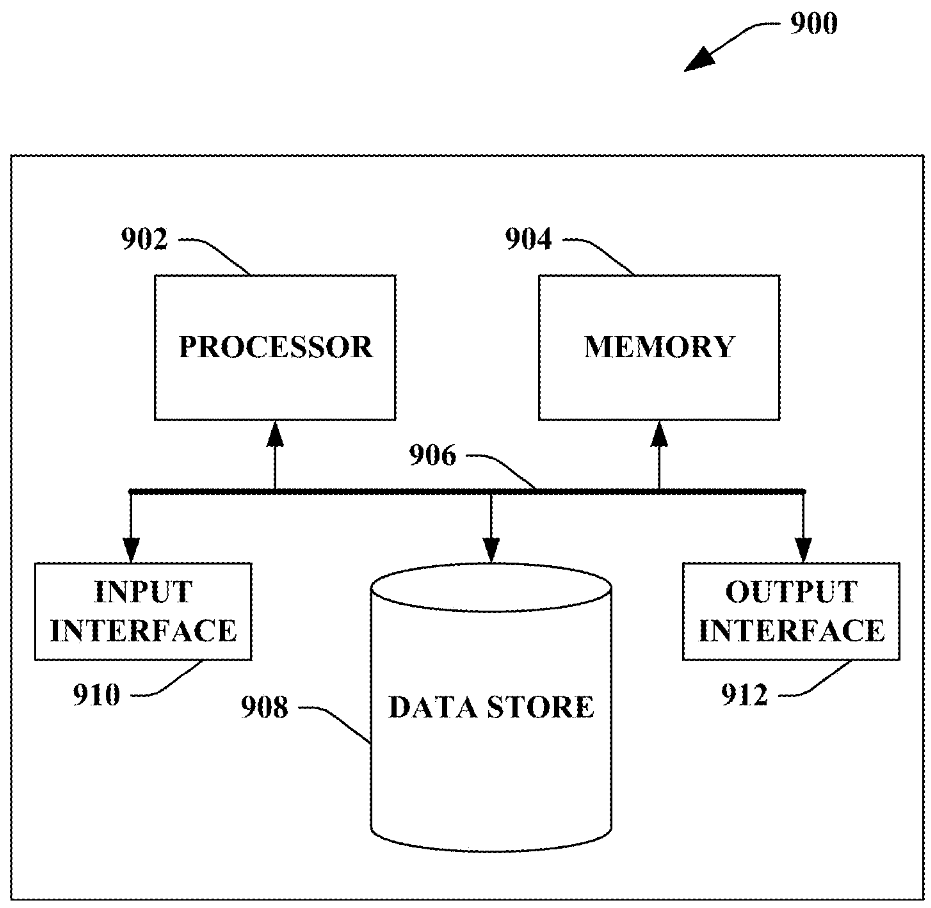
FIG. 9 is an exemplary computing system.

Referring now to FIG. 9, a high-level illustration of an exemplary computing device 900 that can be used in accordance with the systems and methodologies disclosed herein is illustrated. For instance, the computing device 900 may be or include the computing system 816. The computing device 900 includes at least one processor 902 that executes instructions that are stored in a memory 904. The instructions may be, for instance, instructions for implementing functionality described as being carried out by one or more modules, components, or systems discussed above or instructions for implementing one or more of the methods described above. The processor 902 may be a GPU, a plurality of GPUs, a CPU, a plurality of CPUs, a multi-core processor, a combination of the foregoing, etc. The processor 902 may access the memory 904 by way of a system bus 906. In addition to storing executable instructions, the memory 904 may also store radar data, beamformed radar data, neural network configurations, etc.

The computing device 900 additionally includes a data store 908 that is accessible by the processor 902 by way of the system bus 906. The data store 908 may include executable instructions, radar data, beamformed radar data, embeddings of these data in latent spaces, etc. The computing device 900 also includes an input interface 910 that allows external devices to communicate with the computing device 900. For instance, the input interface 910 may be used to receive instructions from an external computing device, etc. The computing device 900 also includes an output interface 912 that interfaces the computing device 900 with one or more external devices. For example, the computing device 900 may transmit control signals to the vehicle propulsion system 810, the braking system 812, and/or the steering system 814 by way of the output interface 912.

Additionally, while illustrated as a single system, it is to be understood that the computing device 900 may be a distributed system. Thus, for instance, several devices may be in communication by way of a network connection and may collectively perform tasks described as being performed by the computing device 900.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc, as used herein, include compact disc (CD), laser disc, optical disc, digital versatile disc (DVD), floppy disk, and Blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionally described herein can be performed, at least in part, by one or more hardware logic components. For example, and without limitation, illustrative types of hardware logic components that can be used include FPGAs, ASICs, Application-specific Standard Products (ASSPs), SOCs, Complex Programmable Logic Devices (CPLDs), etc.

Described herein are various technologies according to at least the following examples.

(A1) In an aspect, a method performed by a radar system is described herein. The method includes receiving a radar signal at receive antennas. The method further includes selecting one or more training cells for noise power estimation, from which radar signals have been received. The method also includes calculating a mean noise power value for the one or more training cells. Further, the method includes calculating a noise power variance for the one or more training cells. Additionally, the method includes estimating a probability of false alarm (PFA) threshold to be applied for a non-training cell. The method also includes estimating a PFA threshold offset based on the noise power variance. The method further includes adjusting a current PFA threshold offset based on the estimated PFA threshold offset.

(A2) In some embodiments of the method of (A1), the noise power variance is a standard deviation of the noise power of the one or more training cells.

(A3) In some embodiments of the method of at least one of (A1)-(A2): the non-training cell is one of a range cell, an angle cell, and a Doppler cell; the training cells are one or more of range cells, angle cells, and Doppler cells; and the training cells are not the same type of cell as the non-training cell.

(A4) In some embodiments of the method of at least one of (A1)-(A3), the training cells are selected from among cells that neighbor the non-training cell.

(A5) In some embodiments of the method of at least one of (A1)-(A4), the selecting, calculating, and estimating steps are performed offline during a training phase.

(A6) In some embodiments of the method of at least one of (A1)-(A5), the selecting, calculating, and estimating acts are performed online in real time, and wherein estimating the PFA threshold offset comprises: calculating a difference between a noise power of respective training cells and a mean noise power across all training cells; determining an absolute value of the calculated difference; and estimating the PFA threshold offset based upon the absolute value of the calculated difference.

(A7) In some embodiments of the method of at least one of (A1)-(A6), the method is performed on a frame-by-frame basis.

(B1) In another aspect, a radar system is configured to perform at least one of the methods disclosed herein (e.g., any of the methods of (A1)-(A7)).

(C1) In yet another aspect, a radar system includes a hardware logic component (e.g., circuitry), where the hardware logic component is configured to control elements of a radar system to perform at least one of the methods disclosed herein (e.g., any of the methods of (A1)-(A7)).

(D1) In an aspect, a radar system is described herein. The radar system comprises receive antennas that receive a radar signal, and one or more processors configured to perform certain acts. The acts include selecting one or more training cells for noise power estimation based upon the radar signal received at the receive antennas; The acts further include calculating a mean noise power value for the one or more training cells. The acts also include calculating a noise power variance for the one or more training cells. The acts additionally include estimating a probability of false alarm (PFA) threshold to be applied for a non-training cell. Moreover, the acts include estimating a PFA threshold offset based on the noise power variance. The acts also include adjusting a current PFA threshold offset based on the estimated PFA threshold offset.

(D2) In some embodiments of the radar system of (D1), the noise power variance is a standard deviation of the noise power of the one or more training cells.

(D3) In some embodiments of the radar system of at least one of (D1)-(D2): the non-training cell is one of a range cell, an angle cell, and a Doppler cell; the training cells are one or more of range cells, angle cells, and Doppler cells; and the training cells are not the same type of cell as the non-training cell.

(D4) In some embodiments of the radar system of at least one of (D1)-(D3), the training cells are selected from among cells that neighbor the non-training cell.

(D5) In some embodiments of the radar system of at least one of (D1)-(D4), the selecting, calculating, and estimating acts are performed offline during a training phase.

(D6) In some embodiments of the radar system of at least one of (D1)-(D5), the selecting, calculating, and estimating acts are performed online in real time, and wherein estimating the PFA threshold offset comprises: calculating a difference between a noise power of respective training cells and a mean noise power across all training cells; determining an absolute value of the calculated difference; and estimating the PFA threshold offset based upon the absolute value of the calculated difference.

(D7) In some embodiments of the radar system of at least one of (D1)-(D6), the acts are performed on a frame-by-frame basis.

(E1) In another aspect, a radar analysis system includes one or more processors configured to perform certain acts. The acts include selecting one or more training cells for noise power estimation based upon a radar signal received at one or more receive antennas. The acts further include calculating a mean noise power value for the one or more training cells. The acts further include calculating a noise power variance for the one or more training cells. The acts also include estimating a probability of false alarm (PFA) threshold to be applied for a non-training cell. Additionally, the acts include estimating a PFA threshold offset based on the noise power variance. Moreover, the acts include adjusting a current PFA threshold offset based on the estimated PFA threshold offset.

(E2) In some embodiments of the radar analysis system of (E1), the noise power variance is a standard deviation of the noise power of the one or more training cells.

(E3) In some embodiments of the radar system of at least one of (E1)-(E2), the non-training cell is one of a range cell, an angle cell, and a Doppler cell; the training cells are one or more of range cells, angle cells, and Doppler cells; and the training cells are not the same type of cell as the non-training cell.

(E4) In some embodiments of the radar system of at least one of (E1)-(E3), the training cells are selected from among cells that neighbor the non-training cell.

(E5) In some embodiments of the radar system of at least one of (E1)-(E4), the selecting, calculating, and estimating acts are performed offline during a training phase.

(E6) In some embodiments of the radar system of at least one of (E1)-(E5), the acts are performed on a frame-by-frame basis.

(F1) In still yet another aspect, use of any of the radar systems (e.g., any of (D1)-(D7) or (E1-E6)) to detect and classify a target is contemplated.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method performed by a radar system, the method comprising:
- receiving a radar signal at receive antennas;
- processing the received radar signal with analog signal processing circuitry;
- digitizing the processed radar signal using at least one analog-to-digital converter (ADC) to generate radar data;
- executing, by a digital signal processor, a range fast Fourier transform (FFT) and a Doppler FFT on the radar data to generate range and Doppler data values;
- selecting one or more training cells for noise power estimation, from which radar signals have been received;
- calculating a mean noise power value for the one or more training cells;
- for each of the one or more training cells, calculating a deviation value by determining a difference between the noise power of the training cell and the mean noise power value;
- calculating a standard deviation of the deviation values for the one or more training cells;
- determining a trained probability of false alarm (PFA) threshold offset by multiplying the standard deviation by a scaling factor k, wherein k is obtained from an inverse cumulative distribution function corresponding to a desired PFA; estimating a PFA threshold to be applied for a non-training cell;
- setting a current PFA threshold offset;
- comparing the current PFA threshold offset to the trained PFA threshold offset and a guard interval offset;
- replacing the current PFA threshold offset with the trained PFA threshold offset only when an absolute difference between the current PFA threshold offset and the trained PFA threshold offset exceeds the guard interval offset;
- controlling the analog signal processing circuitry to mix a radar signal with a carrier signal to shift a center frequency of the radar signal and to hop between frequency subbands used for transmission and receiving, and to perform amplification operations on radar signals output by the receive antenna;
- digitizing the radar signal after said mixing and amplification using at least one analog-to-digital converter (ADC) to generate radar data; executing, by a digital signal processor, a range fast Fourier transform (FFT) and a Doppler FFT on the radar data to generate range and Doppler data values;
- applying a cell-averaging constant false alarm rate (CA-CFAR) detection routine to the radar data using an adjusted PFA threshold offset; and
- populating one or more multi-dimensional point clouds with a detected target cell corresponding to the non-training cell.

2. The method of claim 1, wherein:

the non-training cell is one of a range cell, an angle cell, and a Doppler cell;

wherein the training cells are one or more of range cells, angle cells, and Doppler cells;

and wherein the training cells are not the same type of cell as the non-training cell.

3. The method of claim 1, wherein the training cells are selected from among cells that neighbor the non-training cell.

4. The method of claim 1, wherein the selecting, calculating, and estimating steps are performed offline during a training phase.

5. The method of claim 1, wherein the selecting, calculating, and estimating acts are performed online in real time, and wherein estimating the PFA threshold offset comprises:

calculating a difference between a noise power of respective training cells and a mean noise power across all training cells;

determining an absolute value of the calculated difference; and estimating the PFA threshold offset based upon the absolute value of the calculated difference.

6. The method of claim 1, performed on a frame-by-frame basis.

7. The method of claim 1, wherein the analog signal processing circuitry comprises a mixer configured to combine the received radar signal with a local oscillator signal prior to digitization by the analog-to-digital converter.

8. The method of claim 1, wherein the programmable guard interval offset is dynamically adjusted based on environmental conditions detected by the radar system, including interference level or ambient noise.

9. The method of claim 1, wherein the one or more multi-dimensional point clouds are transmitted to a central processing unit or computer for further processing, and the radar system is configured to store at least the point cloud and the corresponding adjusted PFA threshold offset in a memory or data store.

10. A radar system comprising:

receive antennas that receive a radar signal; and one or more processors configured to perform acts comprising:

processing the received radar signal with analog signal processing circuitry;

digitizing the processed radar signal using at least one analog-to-digital converter (ADC) to generate radar data; executing, by a digital signal processor, a range fast Fourier transform (FFT) and a Doppler FFT on the radar data to generate range and Doppler data values;

selecting one or more training cells for noise power estimation based upon the radar signal received at the receive antennas;

calculating a mean noise power value for the one or more training cells;

for each of the one or more training cells, calculating a deviation value by determining a difference between the noise power of the training cell and the mean noise power value;

calculating a standard deviation of the deviation values for the one or more training cells;

determining a trained probability of false alarm (PFA) threshold offset by multiplying the standard deviation by a scaling factor k, wherein k is obtained from an inverse cumulative distribution function corresponding to a desired PFA estimating a PFA threshold to be applied for a non-training cell;

setting a current PFA threshold offset;

comparing the current PFA threshold offset to the trained PFA threshold offset and a guard interval offset;

replacing the current PFA threshold offset with the trained PFA threshold offset only when an absolute difference between the current PFA threshold offset and the trained PFA threshold offset exceeds the guard interval offset;

controlling the analog signal processing circuitry to mix a radar signal with a carrier signal to shift a center frequency of the radar signal and to hop between frequency subbands used for transmission and receiving, and to perform amplification operations on radar signals output by the receive antenna;

digitizing the radar signal after said mixing and amplification using at least one analog-to-digital converter (ADC) to generate radar data; executing, by a digital signal processor, a range fast Fourier transform (FFT) and a Doppler FFT on the radar data to generate range and Doppler data values;

applying a cell-averaging constant false alarm rate (CA-CFAR) detection routine to the radar data using an adjusted PFA threshold offset; and populating one or more multi-dimensional point clouds with a detected target cell corresponding to in the non-training cell.

11. The radar system of claim 10, wherein:

the non-training cell is one of a range cell, an angle cell, and a Doppler cell;

the training cells are one or more of range cells, angle cells, and Doppler cells; and the training cells are not the same type of cell as the non-training cell.

12. The radar system of claim 10, wherein the training cells are selected from among cells that neighbor the non-training cell.

13. The radar system of claim 10, wherein the selecting, calculating, and estimating acts are performed offline during a training phase.

14. The radar system of claim 10, wherein the selecting, calculating, and estimating acts are performed online in real time, and wherein estimating the PFA threshold offset comprises:

calculating a difference between a noise power of respective training cells and a mean noise power across all training cells;

determining an absolute value of the calculated difference; and estimating the PFA threshold offset based upon the absolute value of the calculated difference.

15. The radar system of claim 10, wherein the acts are performed on a frame-by-frame basis.

16. A radar analysis system comprising:

one or more processors configured to perform acts comprising:

processing a received radar signal with analog signal processing circuitry;

digitizing the processed radar signal using at least one analog-to-digital converter (ADC) to generate radar data;

executing, by a digital signal processor, a range fast Fourier transform (FFT) and a Doppler FFT on the radar data to generate range and Doppler data values;

selecting one or more training cells for noise power estimation based upon a radar signal received at one or more receive antennas;

calculating a mean noise power value for the one or more training cells;

for each of the one or more training cells, calculating a deviation value by determining a difference between the noise power of the training cell and the mean noise power value;

calculating a standard deviation of the deviation values for the one or more training cells;

determining a trained probability of false alarm (PFA) threshold offset by multiplying the standard deviation by a scaling factor k, wherein k is obtained from an inverse cumulative distribution function corresponding to a desired PFA;

estimating a PFA threshold to be applied for a non-training cell;

setting a current PFA threshold offset; comparing the current PFA threshold offset to the trained PFA threshold offset and a guard interval offset;

replacing the current PFA threshold offset with the trained PFA threshold offset only when an absolute difference between the current PFA threshold offset and the trained PFA threshold offset exceeds the guard interval offset;

controlling the analog signal processing circuitry to mix a radar signal with a carrier signal to shift a center frequency of the radar signal and to hop between frequency subbands used for transmission and receiving, and to perform amplification operations on radar signals output by the receive antenna;

digitizing the radar signal after said mixing and amplification using at least one analog-to-digital converter (ADC) to generate radar data; executing, by a digital signal processor, a range fast Fourier transform (FFT) and a Doppler FFT on the radar data to generate range and Doppler data values;

applying a cell-averaging constant false alarm rate (CA-CFAR) detection routine to the radar data using an adjusted PFA threshold offset; and populating one or more multi-dimensional point clouds with a detected target cell corresponding to in the non-training cell.

17. The radar analysis system of claim 16, wherein:

the non-training cell is one of a range cell, an angle cell, and a Doppler cell;

the training cells are one or more of range cells, angle cells, and Doppler cells; and the training cells are not the same type of cell as the non-training cell.

18. The radar analysis system of claim 16, wherein the training cells are selected from among cells that neighbor the non-training cell.

19. The radar analysis system of claim 16, wherein the selecting, calculating, and estimating acts are performed offline during a training phase.

20. The radar analysis system of claim 16, wherein the acts are performed on a frame-by-frame basis.

* * * * *